United States Patent
Höfig

(10) Patent No.: US 9,954,864 B2
(45) Date of Patent: Apr. 24, 2018

(54) PROVIDING SAFE OPERATION OF A SUBSYSTEM WITHIN A SAFETY-CRITICAL SYSTEM

(71) Applicant: Kai Höfig, München (DE)

(72) Inventor: Kai Höfig, München (DE)

(73) Assignee: Siemens Aktiengesellschaft, München (DE)

( * ) Notice: Subject to any disclaimer, the term of this patent is extended or adjusted under 35 U.S.C. 154(b) by 117 days.

(21) Appl. No.: 15/048,022

(22) Filed: Feb. 19, 2016

(65) Prior Publication Data

US 2016/0248775 A1    Aug. 25, 2016

(30) Foreign Application Priority Data

Feb. 20, 2015   (EP) .................................... 15155966

(51) Int. Cl.
*H04L 29/06*     (2006.01)
*G06F 21/71*     (2013.01)

(52) U.S. Cl.
CPC ............. *H04L 63/10* (2013.01); *G06F 21/71* (2013.01)

(58) Field of Classification Search
CPC ................................ H04L 63/10; G06F 21/71
USPC ........................................................... 726/4
See application file for complete search history.

(56) References Cited

U.S. PATENT DOCUMENTS

| | | | |
|---|---|---|---|
| 9,697,355 B1 * | 7/2017 | Park ...................... | G06F 21/552 |
| 2013/0298198 A1 | 11/2013 | Lord et al. | |
| 2015/0048684 A1 * | 2/2015 | Rooyakkers .......... | H04L 9/3263 |
| | | | 307/65 |

FOREIGN PATENT DOCUMENTS

WO    WO2013128338 A1    9/2013

OTHER PUBLICATIONS

European Search Report for European Application No. 15155966.3-1853, dated Aug. 21, 2015.
Rysavy, Ondrej, et al. "A formal authorization framework for networked SCADA systems." Engineering of Computer Based Systems (ECBS), 2012 IEEE 19th International Conference and Workshops on. IEEE, pp. 298-302; 2012.

* cited by examiner

*Primary Examiner* — Baotran N To
(74) *Attorney, Agent, or Firm* — Lempia Summerfield Katz LLC

(57) ABSTRACT

A safety apparatus for providing a safe operation of a subsystem within a safety critical system, SCS is disclosed herein. The safety apparatus includes: a system communication interface for communication with components of the subsystem and other subsystems of the safety critical system; a backend communication interface for communication with a safety cloud backend; an integrated identifier memory storing a unique identifier of the subsystem; and an authorization control unit configured to perform a handshake authorization procedure with another target subsystem of the safety critical system via the system communication interface, and with the safety cloud backend via the backend communication interface to get authorization for the subsystem to execute a safety critical function on the target subsystem of the safety critical system based on the unique identifiers of both subsystems.

18 Claims, 3 Drawing Sheets

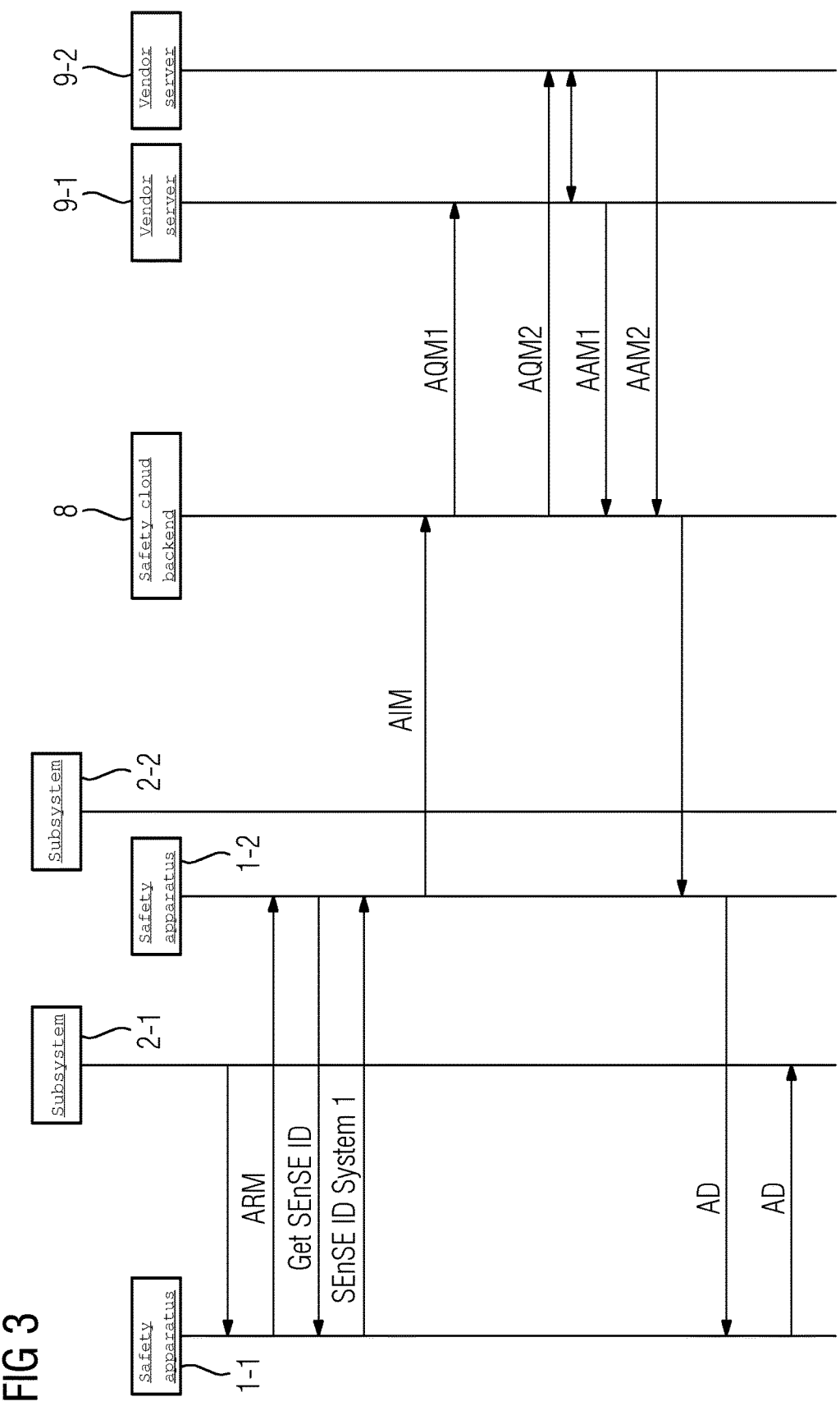

PROVIDING SAFE OPERATION OF A SUBSYSTEM WITHIN A SAFETY-CRITICAL SYSTEM

This application claims the benefit of EP 15155966.3, filed on Feb. 20, 2015, which is hereby incorporated by reference in its entirety.

TECHNICAL FIELD

The embodiments relate to a safety apparatus and a method for providing a safe operation of a subsystem within a safety critical system, e.g., a cyber-physical system.

BACKGROUND

A system may include a plurality of different system components and/or subsystems. These subsystems may include software and/or hardware components. Components in a subsystem include functional components providing functions that may be activated by other components of the same or another subsystem. The components of a subsystem may communicate with each other by a local communication network. A system, (e.g., a safety critical system), may include embedded subsystems that communicate with each other and build up a larger, loosely coupled system having an unknown configuration at runtime. Such a loosely coupled system is often referred to as a cyber-physical system. A safety critical system may be, for instance, an intelligent power distribution network, a healthcare system, or a traffic control system. These kinds of systems may become safety critical due to associated risks during operation. With increasing complexity of such systems, the number of configurations of the system may either be almost infinite or even unknown at design time. Hence, a certification at design time of the system that does document a safe interaction for all possible configurations of all system participants at runtime may become undispensable. In a complex safety critical system, it has to be decided whether or not it is safe for a part or subsystem of such a safety critical system to interoperate with another part or subsystem at runtime of the safety critical system. This has to be decided even when the parts or subsystems of the safety critical system are supplied by different vendors and therefore their interaction becomes a matter of trust between the vendors.

SUMMARY AND DESCRIPTION

The scope of the present invention is defined solely by the appended claims and is not affected to any degree by the statements within this summary. The present embodiments may obviate one or more of the drawbacks or limitations in the related art.

Accordingly, it is an object of the present embodiments to provide an apparatus and a method for providing a safe operation of a subsystem within a safety critical system including a plurality of subsystems interoperating with each other.

This object is achieved by a safety apparatus providing a safe operation of a subsystem within a safety critical system.

According to a first aspect, a safety apparatus for providing a safe operation of a subsystem within a safety critical system includes a system communication interface for communication with components of the subsystem and other subsystems of the safety critical system, a backend communication interface for communication with a safety cloud backend, an integrated identifier memory storing a unique identifier of the subsystem, and an authorization control unit configured to perform a handshake authorization procedure with another target subsystem of the safety critical system via the system communication interface and with the safety cloud backend via the backend communication interface to get authorization for the subsystem to execute a safety critical function on the target subsystem of the safety critical system based on the unique identifiers of both subsystems.

In a possible embodiment of the safety apparatus according to the first aspect, the system communication interface includes a local network communication interface for communication with local components of the subsystem and a communication bus interface for communication with other subsystems of the safety critical system.

In a possible embodiment of the safety apparatus according to the first aspect, the unique identifier is a vendor identifier set by a vendor of the subsystem and activated for use in the handshake authorization procedure at delivery of the subsystem by the vendor.

In a possible embodiment of the safety apparatus according to the first aspect, the safety apparatus is integrated or embedded in the subsystem.

In a further possible embodiment of the safety apparatus according to the first aspect, the authorization control unit of the safety apparatus of the subsystem is configured to generate an authorization request message in response to a request received from the subsystem to initiate an authorization procedure authorizing the subsystem to execute a safety critical function on another target subsystem and configured to send the generated authorization request message via the communication bus interface of the safety apparatus to the safety apparatus of the other subsystem.

In a possible embodiment of the safety apparatus according to the first aspect, the safety apparatus of the subsystem is further configured to send the unique identifier of the subsystem via the communication bus interface of the safety apparatus to a safety apparatus of another subsystem in response to an ID-request message requesting the unique identifier of the subsystem received via the communication bus interface of the safety apparatus from the safety apparatus of the other subsystem.

In a further possible embodiment of the safety apparatus according to the first aspect, the authorization control unit of the safety apparatus of the subsystem is configured to send the unique identifier of the subsystem stored in the identifier memory of the safety apparatus along with a unique identifier of another subsystem received via the communication bus interface of the safety apparatus from a safety apparatus of another subsystem in response to an ID-request message sent by the safety apparatus via the backend communication interface of the safety apparatus to the safety cloud backend.

In a further possible embodiment of the safety apparatus according to the first aspect, the safety cloud backend is configured to evaluate the received unique identifiers of subsystems carried in the received authorization inquiry message and to forward the received unique subsystem identifiers in authorization query messages to vendor servers of vendors of the subsystems.

In a further possible embodiment of the safety apparatus according to the first aspect, the vendor servers are configured to negotiate an authorization for execution of the safety critical function by the subsystem on the target subsystem based on the received unique subsystem identifiers of both subsystems carried in the authorization query messages.

In a further possible embodiment of the safety apparatus according to the first aspect, if both vendor servers successfully negotiate an authorization for the execution of the safety critical function corresponding authorization acknowledgement messages are sent back to the safety cloud backend.

In a further possible embodiment of the safety apparatus according to the first aspect, the safety cloud backend sends authorization data back to the safety apparatus from which the safety cloud backend received the authorization inquiry message after having received the authorization acknowledgement messages from the vendor servers.

In a still further possible embodiment of the safety apparatus according to the first aspect, the authorization control unit of the safety apparatus is configured to receive authorization data from a safety cloud backend via the backend communication interface of the safety apparatus in response to the authorization inquiry message and to forward the received authorization data via the communication bus interface of the safety apparatus from which the authorization control unit received the authorization request message.

In a still further possible embodiment of the safety apparatus according to the first aspect, the authorization control unit of the safety apparatus is configured to receive authorization data from another safety apparatus via the communication bus interface of the safety apparatus and to distribute the received authorization data to the safety critical function to be executed on the other target subsystem.

In a still further possible embodiment of the safety apparatus according to the first aspect, the subsystem of the safety apparatus is configured to send a safety critical function request along with the received authorization data to the other target subsystem to execute the safety critical function using the authorization data.

In a further possible embodiment of the safety apparatus according to the first aspect, the target subsystem is configured to forward the received safety critical function request to the authorization control unit of its safety apparatus for validation of the received authorization data.

In a still further possible embodiment of the safety apparatus according to the first aspect, if the authorization control unit of the safety apparatus of the target subsystem validates the received authorization data, the safety critical function is executed on the target subsystem.

According to a second aspect, a method is described for providing a safe operation of a subsystem within a safety critical system.

According to the second aspect, the method includes performing by an authorization control unit of a safety apparatus of the subsystem a handshake authorization procedure with another target subsystem of the safety critical system and with a safety cloud backend to get authorization for the subsystem to execute a safety critical function on the other target subsystem of the safety critical system based on unique identifiers of both subsystems.

According to a third aspect, a safety critical system is provided.

According to the third aspect, the safety critical system includes subsystems each having a safety apparatus according to the first aspect connected to each other by a system communication interface and to a safety cloud backend by a backend communication interface.

In a possible embodiment of the safety critical system according to the third aspect, the safety cloud backend is connected to vendor servers of vendors supplying the subsystems of the safety critical system.

In a possible embodiment of the safety critical system according to the third aspect, the safety critical system is configured to perform the method according to the second aspect at runtime of the safety critical system.

BRIEF DESCRIPTION OF THE DRAWINGS

In the following, possible embodiments of the different aspects are described in more detail with reference to the enclosed figures.

FIG. 3 depicts an exemplary signal diagram for illustrating the operation of a safety critical system including subsystems each having a safety apparatus according to the first aspect.

DETAILED DESCRIPTION

Figure 1:
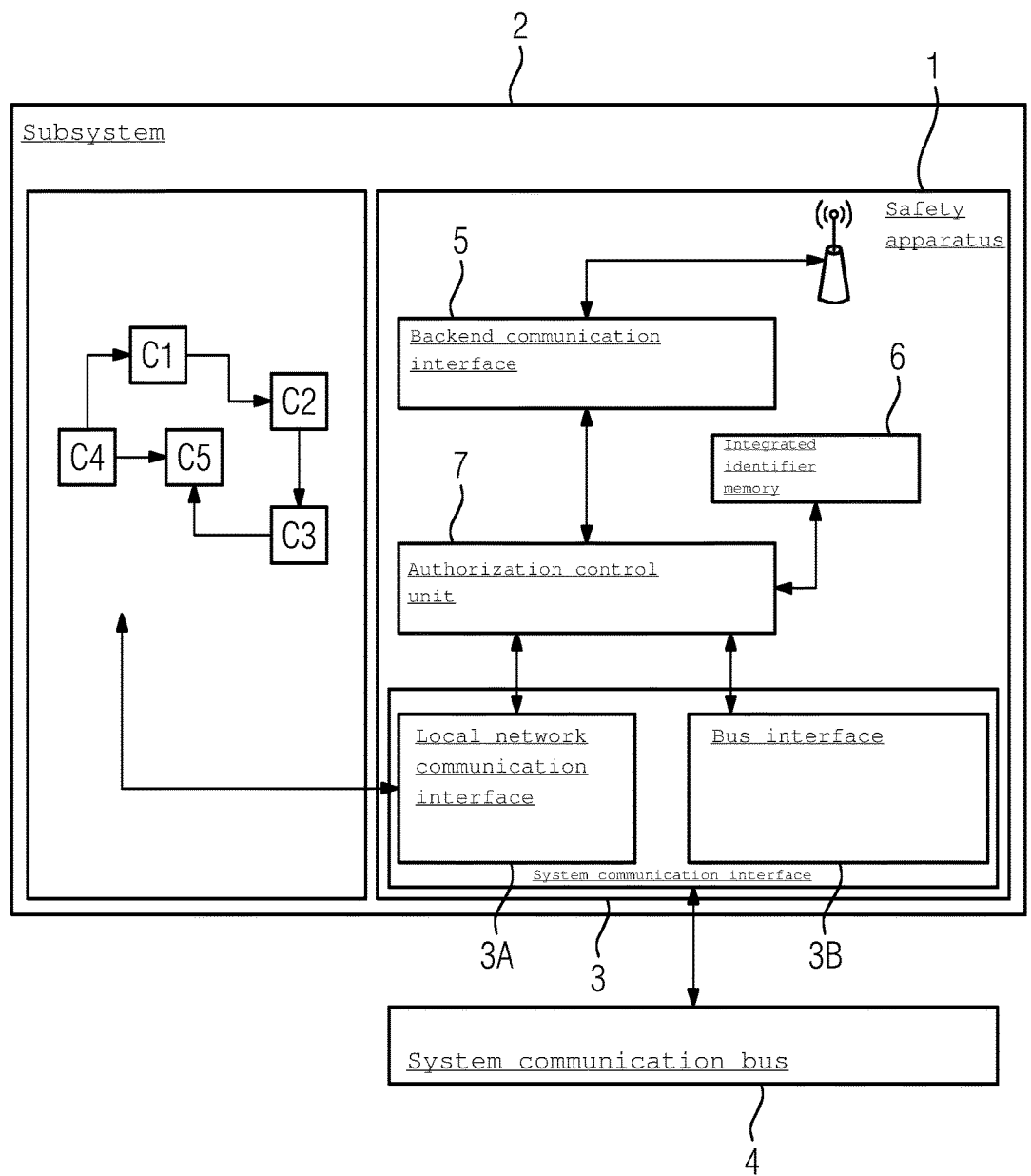
FIG. 1 depicts a possible exemplary embodiment of a safety apparatus embedded in a subsystem of a safety critical system according to the first aspect.

As seen in FIG. 1, a safety apparatus 1 for providing a safe operation of a subsystem 2 within a safety critical system, SCS, may be integrated or embedded in the respective subsystem 2. Accordingly, in a possible embodiment, at least some or all subsystems 2 of the safety critical system, SCS, may include an integrated safety apparatus 1 as illustrated in FIG. 1. In an alternative embodiment, the safety apparatus 1 may also be attached to the respective subsystem 2 and may be connected to at least one component c within the subsystem 2 via an interface. The safety apparatus 1 includes, in the depicted embodiment, a system communication interface 3 for communication with components c of the subsystem 2 and with other subsystems of the safety critical system, SCS. This system communication interface 3 in a possible embodiment includes a local network communication interface, NCI, 3A for communication with local components of the subsystem 2 and a communication bus interface, CBI, 3B for communication with other subsystems of the safety critical system, SCS. In a possible embodiment, the local network communication interface 3A is connected to a local network connecting different functional components c of the subsystem 2 as illustrated in FIG. 1. The communication bus interface 3B is connected in a possible embodiment to a system communication bus 4 as depicted in FIG. 1.

The safety apparatus 1 further includes a backend communication interface, BCI, 5 for communication with a safety cloud backend. The backend communication interface 5 may include a wireless or a wired interface with a safety cloud backend including at least one safety cloud server.

The safety apparatus 1 further includes in the illustrated embodiment an integrated identifier memory 6 configured to store a unique identifier of the subsystem 2 including the embedded safety apparatus 1.

The safety apparatus 1 further includes an authorization control unit 7 configured to perform a handshake authorization procedure with another target subsystem of the safety critical system, SCS, via the system communication interface 3 and with the safety cloud backend via the backend communication interface 5. The authorization control unit 7 is configured to perform the handshake authorization procedure with the target subsystem and with the safety cloud backend to get authorization for the subsystem 2 to execute a safety critical function, SCF, on the target subsystem of the safety critical system, SCS, based on the unique identifiers of both subsystems, e.g., the subsystem 2 as illustrated in FIG. 1 and other target subsystems 2 of the same safety critical system, SCS. The safety apparatus 1 as illustrated in FIG. 1 may be built into an embedded system or subsystem to provide a safe operation of safety critical functions, SCF, free from manipulations. The backend communication interface 5 may be used to communicate with services that are able to come to a decision whether or not a safety critical function, SCF, may be safely executed or not. The system communication interface 3 allows communication with the local components c of the cyberphysical subsystem and with other subsystems of the safety critical system, SCS. The integrated identifier memory 6 may in a possible embodiment store and engrave a digital key phrase that may be set by the vendor of the respective subsystem 2. In a possible embodiment, the unique identifier is a vendor identifier set by a vendor of the subsystem 2 and activated for use in the handshake authorization procedure at delivery of the subsystem 2 by the vendor. The unique identifier of the subsystem 2 allows a unique identification of the safety apparatus 1 and may be highly protected against manipulations of unauthorized readings.

Figure 2:
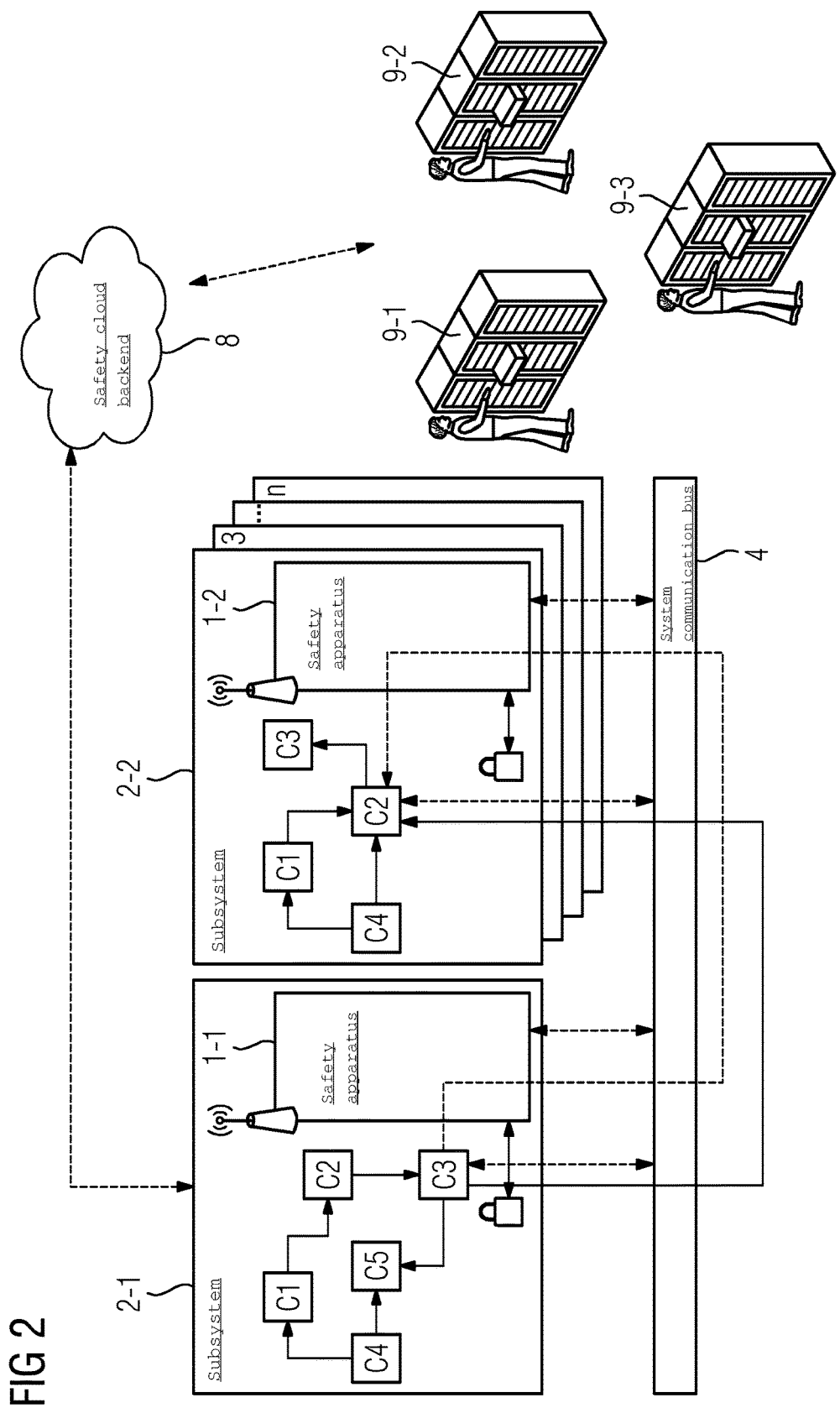
FIG. 2 depicts a diagram for illustrating a possible exemplary safety control system including subsystems each having an embedded safety apparatus according to the first aspect and configured to perform a method according to the second aspect.

FIG. 2 illustrates an exemplary embodiment of a safety critical system, SCS, according to a further aspect including different subsystems 2 each including a safety apparatus 1 according to the first aspect. In the exemplary embodiment illustrated in FIG. 2, the safety critical system, SCS, includes two subsystems 2-1, 2-2 each having an embedded safety apparatus 1☐1, 1-2. The number of subsystems 2-$i$ may vary. In the embodiment depicted in FIG. 2, the safety critical system, SCS, includes n subsystems 2-$i$ connected to a system communication bus 4 of the safety critical system, SCS. Each subsystem 2-$i$ may include several functional components c connected to each other via a local network of the respective subsystem. In the example illustrated in FIG. 2, a first subsystem 2-1 includes five components $c1$, $c2$, $c3$, $c4$, $c5$ communicating with each other via a local network. The second subsystem 2-2 includes four components $c1$, $c2$, $c3$, $c4$ connected to each other via another local network. The safety apparatus 1-1 of the first subsystem 2-1 includes a system communication interface including a local network communication interface, NCI, for communication with the local components $c1$ to $c5$ of the first subsystem 2-1. The second subsystem 2-2 includes a system communication interface 3 having a local network communication interface, NCI, for communication with the local components $c1$ to $c4$ of the second subsystem 2-2. Further, both system communication interfaces, SCI, of the safety apparatuses 1-1, 1-2 include a communication bus interface, CBI, allowing the safety apparatus 1-$i$ to communicate with other subsystems of the safety critical system, SCS, via the communication bus 4. Both safety apparatuses 1-1, 1-2 have a backend communication interface, BCI, for communication with a safety cloud backend 8 as illustrated in FIG. 2. The safety cloud backend 8 may be connected to or include different vendor servers 9-1, 9-2, 9-3 of different vendors supplying the different subsystems 2-$i$ of the safety critical system, SCS. The number of subsystems 2-$i$ of the safety critical system, SCS, may vary. Moreover, the number of system components c within a subsystem may be different in different subsystems 2-$i$. The components c of the subsystems 2-$i$ may include hardware and/or software components c. The safety critical system, SCS, as illustrated in FIG. 2 may be, for example, an intelligent power distribution network or a highly reliable healthcare system. Further examples for safety critical systems, SCS, are traffic control systems, automotive driver assistance systems, industrial automation systems, and process-steering systems. Further, a safety critical system, SCS, may include sustainable environmental systems or infrastructure and communication systems. The subsystems 2-$i$ illustrated in FIG. 2 may include subsystems of a larger cyber-physical system. Subsystems 2-$i$ may already interact safely and secure with each other and perform some safety critical functions, SCF, for example, if subsystem 2-1 wants to use some of the safety critical functions, SCFs, and is about to change the configuration of the safety critical system, SCS. The safety apparatus 1-1, 1-2 may be used to authorize subsystem 2-1 to use a specific set of safety critical functions, SCFs, on subsystem 2-2 of the safety critical system, SCS, using the safety cloud backend and enables a secure communication to assure that the safety critical functions, SCFs, are called by subsystem 2-1 and not by another unauthorized subsystem.

FIG. 3 depicts a signaling diagram illustrating the operation of a safety apparatus 1 according to the first aspect. FIG. 3 illustrates an exemplary handshake authorization procedure performed by an authorization control unit, ACU, within the safety apparatus 1-$i$ according to the first aspect. The handshake authorization procedure is described act by act. A message, as depicted in FIG. 3, is illustrated by an arrow from one participant (sender) to another participant (receiver). The transmitted messages are sorted in chronological order from top to bottom. First, the system 2-1 calls a function that is safety critical by requesting subsystem 2-2 to perform this safety critical function, SCF. In the given example, since subsystem 2-1 is not authorized, the execution of the safety critical function, SCF, is denied by subsystem 2-2 of the safety critical system, SCS.

After having received the denial, subsystem 2-1 sends a request to its safety apparatus 1-1 to initiate the authorization procedure for this safety critical function, SCF, on the subsystem 2-2. The safety apparatus 1-1 of subsystem 2-1 then sends a request to the safety apparatus 1-2 of subsystem 2-2 to authorize the execution of the safety critical function, SCF, on subsystem 2-2 for subsystem 2-1. This request is sent as an authorization request message, ARM, as illustrated in FIG. 3. In a further act, the safety apparatus 1-2 of subsystem 2-2 requests the unique identifier from the safety apparatus 1-1 of subsystem 2-1 as depicted in FIG. 3. In the example illustrated in FIG. 3, the safety apparatus 1-2 of subsystem 2-1 sends the unique identifier of subsystem 2-1 to the safety apparatus 1-2 of subsystem 2-2. The safety apparatus 1-2 of subsystem 2-2 sends the unique identifier of subsystem 2-1 and its own unique identifier, (e.g., the unique identifier of subsystem 2-2), to the safety cloud backend 8 in an authorization inquiry message, AIM, to receive an answer whether subsystem 2-1 is authorized to execute the safety critical function, SCF, on subsystem 2☐2. The authorization inquiry message, AIM, is sent in a possible embodiment to a safety cloud server 8 of the safety cloud identifying in a possible embodiment the vendors of subsystem 2-1 based on the received unique identifies. As may be seen in FIG. 3, the safety cloud server 8 forwards the received authorization inquiry message, AIM, in a first authorization query message, AQM1, to a first vendor server 9-1 and in a second authorization query message, AQM2, to a second vendor server 9-2. Both authorization query messages, AQM1, AQM2 carry the unique identifiers of both subsystems 2-1, 2-2. The first vendor server 9-1 is a server of a vendor of the first subsystem 2-1 of the safety critical system, SCS. The second vendor server 9-2 is a server of a vendor of the second subsystem 2-2 of the safety critical system, SCS. The vendors of subsystem 2-1 and of subsystem 2-2 then negotiate an authorization as illustrated in FIG. 3 with each other. The negotiation is performed in an embodiment automatically using the unique identifiers of both subsystems 2-1, 2-2. In an alternative embodiment, the negotiation may also be performed manually by the vendors of both subsystems.

If it is safe from the point of view of the first vendor supplying subsystem 2-1 to let subsystem 2-1 execute the safety critical function, SCF, on subsystem 2-2, the received request from the safety cloud server 8 may be authorized and the server 9-1 of the first vendor transmits a first authorization acknowledgement message, AAM1, to the safety cloud server 8.

If it is safe from the point of view of the second vendor supplying the second subsystem 2-2 to let subsystem 2-1 execute the safety critical function, SCF, on subsystem 2-2, the request of the safety cloud server 8 may be authorized and the vendor server 9-2 of the second vendor transmits an authorization acknowledgement message, AAM2, to the safety cloud server 8 as illustrated in FIG. 3.

If the safety cloud server 8 receives an authorization acknowledgement message AAM from both vendor servers 9-1, 9-2, (e.g., if both authorizations are positive), the safety cloud server 8 sends authorization data, AD, back to the safety apparatus that requested the authorization. In the illustrated example of FIG. 3, the safety cloud 8 sends the authorization data, AD, to the safety apparatus 1-2 of the second subsystem 2-2 having previously sent the authorization inquiry message, AIM, to the safety cloud server 8.

As soon as the safety apparatus 1-2 of the target subsystem 2-2 receives positive authorization data, AD, from the safety cloud server 8, it forwards this authorization data, AD, to the safety apparatus of the first subsystem 2-1. Otherwise, the safety apparatus of subsystem 2-2 may inform the safety apparatus 1-1 of subsystem 2-1 that the action has been denied (not depicted).

The safety apparatus 1-1 of the first subsystem 2-1 receives the authorization data, AD, from the safety apparatus 1-2 of the target subsystem as illustrated in FIG. 3 and may distribute the received authorization data, AD, to the function that requested to execute the safety critical function on the target subsystem 2-2. Subsystem 2-1 may now send a request to execute a safety critical function to subsystem 2-2 using the received authorization data, AD, as depicted in FIG. 3. The function that is responsible for the execution of the safety critical function, SCF, on subsystem 2-1 receives the request and the authorization data, AD, and may send a request for validation to its safety apparatus 1-2. If the authorization control unit, ACU, 7 of the safety apparatus 1-2 of the target subsystem 2-2 may validate the received authorization data, AD, it answers positive, otherwise it sends a negative answer (not depicted). If the authorization control unit 7 of the safety apparatus 1-2 may validate the authorization data, AD, the safety critical function, SCF, is executed on the target subsystem 2-2.

Since safety critical systems, SCS, may be executed in different environments in terms of performance, energy availability, wireless network connectivity or communication bandwidth, the safe communication may be adopted to the degree of security required for the respective application.

In a possible embodiment of the safety critical system, SCF, the communication between the participants is entirely protected by the safety apparatuses. In this embodiment, all communication is routed through the safety apparatus and encrypted.

In an alternative embodiment, the communication is only initiated using the safety apparatus 1. In this embodiment, the communication may take place directly between the functional units or components c of the different subsystems 2. In a possible embodiment, to protect the communication, the unique identifier may be used to generate single use transaction codes. In this embodiment, every time information is exchanged, a new single use transaction code may be requested from the corresponding safety apparatus 1 and the other device is used to validate the transaction code.

In the safety critical system, SCS, the authorization is performed by a negotiation procedure between the vendor servers 9-1, 9-2 of the vendors supplying the different subsystems 2-1, 2-2 of the safety critical system, SCS, based on the unique identifiers of both subsystems. In a possible embodiment, this authorization may be performed automatically by a negotiation procedure between the vendor servers, wherein both vendor servers perform a safety analysis investigating whether the target subsystem may execute a safety critical function, SCF, for the requesting subsystem without causing safety risks of the entire safety critical system SCS. In a possible embodiment, the vendor servers 9-$i$ may employ for the safety analysis, FTA, a fault tree analysis within a fault tree model of the respective subsystems 2 and their components c.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A safety apparatus of a subsystem for providing a safe operation of the subsystem within a safety critical system, the safety apparatus comprising:
   a system communication interface for communication with components of the subsystem and other subsystems of the safety critical system;
   a backend communication interface for communication with a safety cloud backend;
   an integrated identifier memory storing a unique identifier of the subsystem; and
   an authorization control unit configured to perform a handshake authorization procedure with a target subsystem of the safety critical system via the system communication interface and with the safety cloud backend via the backend communication interface to get authorization for the subsystem to execute a safety critical function on the target subsystem of the safety critical system based on unique identifiers of both subsystems.

2. The safety apparatus of claim 1, wherein the system communication interface comprises:
   a local network communication interface for communication with local components of the subsystem; and
   a communication bus interface for communication with the other subsystems of the safety critical system.

3. The safety apparatus of claim 1, wherein the unique identifier is a vendor identifier set by a vendor of the subsystem and is activated for use in the handshake authorization procedure at delivery of the subsystem by the vendor.

4. The safety apparatus of claim 1, wherein the safety apparatus is integrated or embedded in the subsystem.

5. The safety apparatus of claim 1, wherein the authorization control unit of the safety apparatus of the subsystem is configured to generate an authorization request message in response to a request received from the subsystem to initiate an authorization procedure authorizing the subsystem to execute the safety critical function on the target subsystem and configured to send the generated authorization request message via the communication bus interface of the safety apparatus of the subsystem to a safety apparatus of the target subsystem.

6. The safety apparatus of claim 5, wherein the authorization control unit of the safety apparatus of the subsystem is further configured to send the unique identifier of the subsystem via the communication bus interface of the safety apparatus to the safety apparatus of the target subsystem in response to an ID-request message requesting the unique identifier of the subsystem received via the communication bus interface of the safety apparatus of the subsystem from the safety apparatus of the target subsystem.

7. The safety apparatus of claim 1, wherein the authorization control unit of the safety apparatus of the subsystem is configured to send the unique identifier of the subsystem via the communication bus interface of the safety apparatus of the subsystem to a safety apparatus of the target subsystem in response to an ID-request message requesting the unique identifier of the subsystem received via the communication bus interface of the safety apparatus of the subsystem from the safety apparatus of the target subsystem.

8. The safety apparatus of claim 7, wherein the authorization control unit of the safety apparatus of the subsystem is configured to send the unique identifier of the subsystem stored in the identifier memory of the safety apparatus along with a unique identifier of the target subsystem received via the communication bus interface of the safety apparatus from the safety apparatus of the target subsystem in response to an ID-request message sent by the safety apparatus of the subsystem via the backend communication interface of the safety apparatus of the subsystem to the safety cloud backend.

9. The safety apparatus of claim 8, wherein the safety cloud backend is configured to evaluate the received unique identifiers of subsystems carried in the received authorization inquiry message and to forward the received unique subsystem identifiers in authorization query messages to vendor servers of vendors of the subsystems.

10. The safety apparatus of claim 9, wherein the vendor servers are configured to negotiate an authorization for execution of the safety critical function by the subsystem on the target subsystem based on the received unique subsystem identifiers of both subsystems carried in the authorization query messages,
wherein when both vendor servers successfully negotiate an authorization for the execution of the safety critical function, corresponding authorization acknowledgement messages are sent back to the safety cloud backend.

11. The safety apparatus of claim 10, wherein the safety cloud backend sends authorization data back to the safety apparatus of the subsystem from which the safety cloud backend received the authorization inquiry message after having received the authorization acknowledgement messages from the vendor servers.

12. The safety apparatus of claim 11, wherein the authorization control unit of the safety apparatus of the subsystem is configured to receive authorization data from a safety cloud backend via the backend communication interface of the safety apparatus of the subsystem in response to the authorization inquiry message, and to forward the received authorization data via the communication bus interface of the safety apparatus of the subsystem from which the authorization control unit received the authorization request message.

13. The safety apparatus of claim 1, wherein the authorization control unit of the safety apparatus is configured to receive authorization data from another safety apparatus via the communication bus interface of the safety apparatus and to distribute the received authorization data to the safety critical function to be executed on the target subsystem.

14. The safety apparatus of claim 1, wherein the subsystem of the safety apparatus is configured to send a safety critical function request along with the received authorization data to the target subsystem to execute the safety critical function, using the authorization data,
wherein the target subsystem is configured to forward the received safety critical function request to the authorization control unit of the safety apparatus for validation of the received authorization data,
wherein when an authorization control unit of a safety apparatus of the target subsystem validates the received authorization data, the safety critical function is executed on the target subsystem.

15. A method for providing a safe operation of a subsystem within a safety critical system, the method comprising:
providing a safety apparatus of the subsystem, the safety apparatus comprising a system communication interface, a backend communication interface, an integrated identifier memory, and an authorization control unit; and
performing, by the authorization control unit of the safety apparatus of the subsystem, a handshake authorization procedure with a target subsystem of the safety critical system and with a safety cloud backend via the backend communication interface to get authorization for the subsystem to execute a safety critical function on the target subsystem of the safety critical system, based on unique identifiers of both subsystems.

16. A safety critical system comprising:
subsystems, wherein each subsystem has a safety apparatus for providing a safe operation of the respective subsystem within the safety critical system, wherein the subsystems are connected to each other by a respective system communication interface and to a safety cloud backend by a respective backend communication interface, and
wherein each safety apparatus comprises:
a system communication interface for communication with components of a subsystem and other subsystems of the safety critical system;
a backend communication interface for communication with a safety cloud backend;
an integrated identifier memory storing a unique identifier of the respective subsystem; and
an authorization control unit configured to perform a handshake authorization procedure with a target subsystem of the safety critical system via the system communication interface and with the safety cloud backend via the backend communication interface to get authorization for the subsystem to execute a safety critical function on the target subsystem of the safety critical system based on the unique identifiers of both subsystems.

17. The safety critical system of claim 16, wherein the safety cloud backend is connected to vendor servers of vendors supplying the subsystems of the safety critical system.

18. The safety critical system of claim 16, wherein the safety critical system is configured to perform the handshake authorization procedure at runtime of the safety critical system.

* * * * *